UNITED STATES PATENT OFFICE.

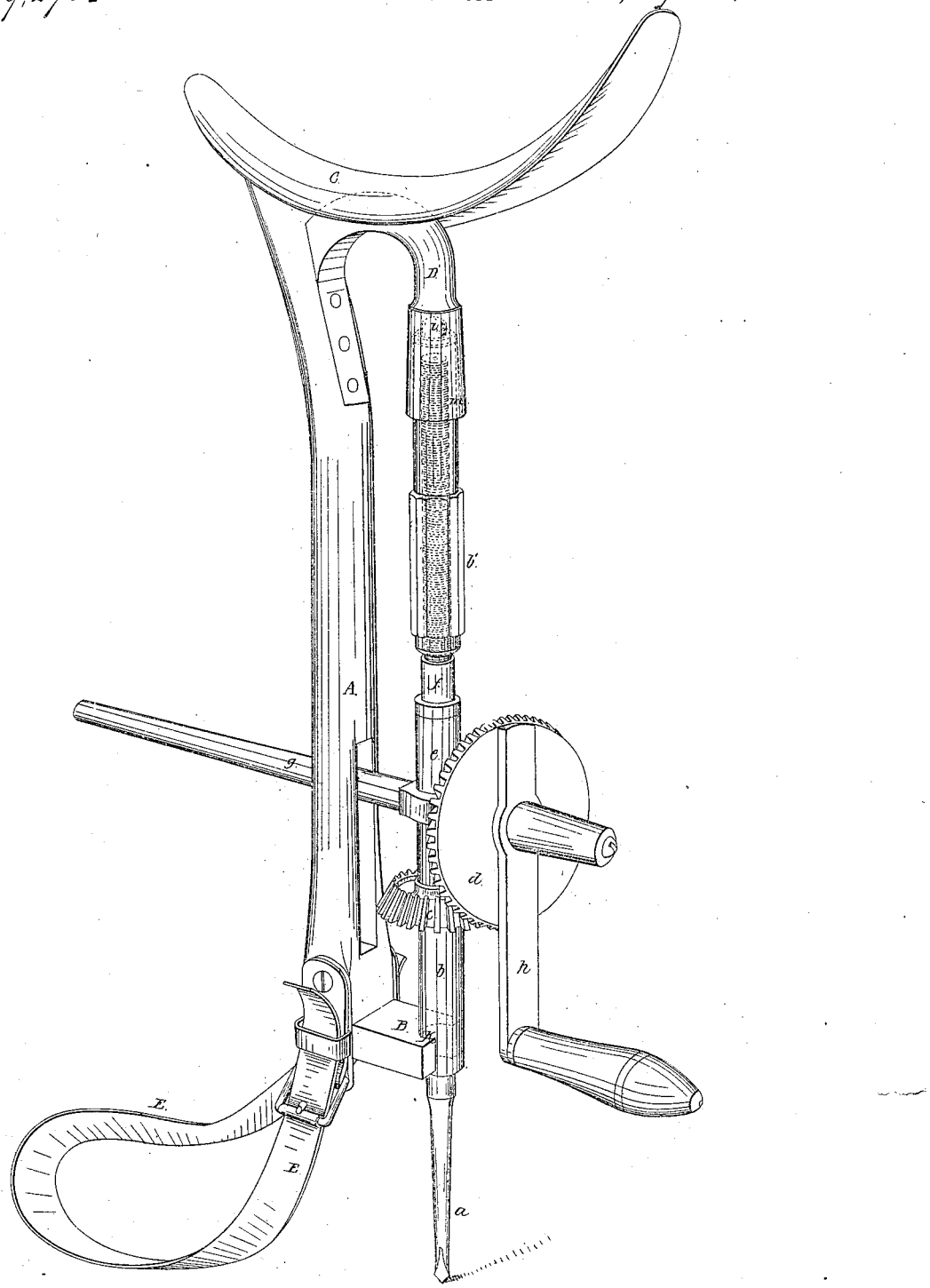

REUBEN DANIELS, OF WOODSTOCK, VERMONT.

HAND DRILLING-MACHINE.

Specification of Letters Patent No. 9,271, dated September 21, 1852.

*To all whom it may concern:*

Be it known that I, REUBEN DANIELS, of Woodstock, in the county of Windsor and State of Vermont, have invented certain new and useful Improvements in Hand-Drills, of which the following is a full, clear, and exact description, reference being had to the accompanying drawings, forming part of this specification, and in which—

Figure 1, represents a view in perspective of a geared hand drill with my improvements applied thereto.

The accompanying drawing represents a geared-hand drill supported in a stock having some resemblance to a crutch. The bit (a) is fitted into a socket in a mandrel (b) in the usual manner so that it can be removed to sharpen or to be replaced by another. The mandrel is made in two parts (b and $b^1$) the one screwing into the other in such manner, that it can at will, be shortened or lengthened by turning either of its two parts so that the screws will tend to draw them together or to separate them. About the middle of the mandrel a bevel wheel (c) is secured which gears into another bevel wheel (d) mounted on a pivot projecting from a sleeve (e), placed upon the mandrel and held between the wheel (c), and a collar (f), in such manner, that the mandrel will turn freely in the sleeve. On the side of the sleeve opposite the wheel (d), an arm (g) projects which forms a guide to prevent the gear from turning around the mandrel and to steady the latter in the stock, and a handle for the attendant to direct the drill with. The wheel (d) is fitted with a winch (h) by which it can be turned with one hand to revolve the mandrel, while the other hand is applied to the arm (g) to steady the apparatus. The extremity of the part ($b^1$) of the mandrel is fitted with a pivot (i) of hardened steel which fits into a step in the stock, the pressure required to cause the drill to penetrate is applied to this pivot, and therefore it must be both hard and smooth to prevent too much friction. The inner extremity of the part ($b^1$) of the mandrel is squared or octagonal that it may be more easily grasped to turn it, or hold it from turning. The stock upon which the mandrel and gearing are mounted consists of a bar (A) having on one end a bracket (B) with a concave rest (K) formed in it to support the front part (b) of the mandrel. The opposite end of the bar (A) of the stock is fitted with a clutch (C) on the underside of which a bracket (D) projects; this bracket has a cylindrical aperture (m) in its lower extremity the center of which is at the same distance from the bar (A) as the center of the circle of the rest (K) in the bracket (B). The bottom of this aperture is fitted with a step to receive the pivot (i) of the mandrel; this step like the pivot must be hard and smoothly finished. The bracket (B) is fitted with a stirrup (E) made in this instance of a leather strap, and fitted with a buckle to contract and enlarge it at pleasure. This stirrup may however be made in any convenient manner, and of any flexible material suitable for the purpose.

The slot $g^1$ in the stock (A) is in length equal to the distance which the mandrel may with advantage be elongated so that when the mandrel is contracted at the commencement of boring a hole the arm $g$ will be at the upper extremity of the slot and as the drill progresses and the mandrel elongates the gear will descend and the arm will slide down the slot and keep the drill as steady as if the gearing was fixed rigidly in a frame instead of moving up and down with the mandrel.

When it is required to use the drill the end of the arm (g) is first passed through the slot ($g^1$) in the lower part of the bar (A), the pivot (i) inserted into the step in the bracket (D) and the lower part of the mandrel placed in the rest in the bracket (B), as represented in the drawing, and the mandrel is contracted to its shortest length.

If it be required to drill a hole through an upright shaft of iron for example, the stirrup is unbuckled and its ends passed around the shaft and drawn tightly to press the end of the drill firmly against the part through which the hole is required to be bored, when the ends of the stirrup are buckled, the shoulder or any other convenient part of the body is pressed lightly against the crutch (C) to steady the drill and one hand is applied to the winch (h) to turn it while the other hand grasps the arm (g) to assist in steadying the apparatus; as the bit advances; the squared portion of the mandrel ($b^1$) is occasionally turned as required to maintain the proper pressure upon the bit, and keep it cutting. If it be required the drill to bore downward into a body that does not admit of a stirrup being buckled around it, the strap may be taken up until it is at the proper height to place the foot in it; in this way, the requisite pressure can be applied to the drill by the foot without fatigue or inconvenience. If it is required to bore something over-head, either vertically or obliquely to which the instrument cannot be affixed by the stirrup, the crutch may be placed on the shoulder and pressure applied by bracing up the body against it, in the same manner that the operator would do, if he were lifting a heavy weight. If the crutch comes too low to place the shoulder beneath it, the thigh may be applied instead, and this will be in many cases a very convenient way of holding the instrument while at work. This drill may be fixed in a blacksmith's vise and be used in lieu of a press-drill. These are a few of the modes of holding and applying the instrument, but by no means all, or even a considerable part of them, but any one who understands how to work with tools of this kind, will readily see how to apply the instrument under the various circumstances that occur.

What I claim as my invention and desire to secure by Letters Patent is—

The combination of the geared mandrel which elongates to feed the drill, with the arm ($g$) that projects from the sleeve ($e$) to steady the gearing, and the slot ($g^1$) in the stock (A) to guide and steady the arm while traversing therein to permit the drill to be advanced and withdrawn as herein set forth.

In testimony whereof I have hereunto subscribed my name.

REUBEN DANIELS.

Witnesses:
A. B. CHILDS,
P. H. WATSON.